United States Patent [19]

Hatano

[11] Patent Number: 5,057,963

[45] Date of Patent: Oct. 15, 1991

[54] OPPOSITE PHASE DETECTING DEVICE FOR ALTERNATING CURRENT ELECTRICAL EQUIPMENT

[75] Inventor: Yukihiko Hatano, Ichinomiya, Japan

[73] Assignee: Kabushiki Kaisha Toshiba, Kanagawa, Japan

[21] Appl. No.: 482,787

[22] Filed: Feb. 21, 1990

[30] Foreign Application Priority Data

Mar. 30, 1989 [JP] Japan .................................. 1-76511

[51] Int. Cl.[5] ............................................ H02H 3/26
[52] U.S. Cl. ......................................... 361/85; 361/77
[58] Field of Search ..................... 361/85, 77; 340/658

[56] References Cited

U.S. PATENT DOCUMENTS

| | | | |
|---|---|---|---|
| 3,838,314 | 9/1974 | Boothman et al. | 361/85 |
| 4,045,682 | 8/1977 | Poorbaugh et al. | 361/77 |
| 4,284,939 | 8/1981 | Kawada et al. | 361/77 |
| 4,562,507 | 12/1985 | Kudo et al. | 361/85 |
| 4,878,208 | 10/1989 | Seki et al. | 361/85 |

Primary Examiner—Steven L. Stephan
Assistant Examiner—Edward H. To
Attorney, Agent, or Firm—Philip M. Shaw, Jr.

[57] ABSTRACT

An opposite phase detecting device for alternating current electrical equipments includes a zero cross circuit synchronizing positive half waves of first and second line voltages of a three-phase AC supply supplied to an AC electrical equipment and generating first and second synchronizing pulses each having a pulse width corresponding to an electrical angle of approximately 180 degrees, a counter circuit counting the first synchronizing pulses from the zero cross circuit, a one-shot multivibrator triggered by the second synchronizing pulse to thereby generate a reset pulse having a relatively short time interval, and an AND circuit generating a reset signal based on a logical multiplication of the reset pulse generated by the pulse generating circuit and the first synchronizing pulse generated by the synchronous circuit. The counter circuit is reset when supplied with the reset signal from the AND circuit. The counter circuit generates an opposite phase detection signal when the count value thereof reaches a predetermined value.

1 Claim, 2 Drawing Sheets

OPPOSITE PHASE DETECTING DEVICE FOR ALTERNATING CURRENT ELECTRICAL EQUIPMENT

BACKGROUND OF THE INVENTION

This invention relates to an opposite phase detecting device which detects an opposite phase condition of a three-phase AC power supply for alternating current electrical equipments.

Three-phase induction motors have widely been employed as drive sources of large-scaled electrical equipments such as conveyors, blowers and pumps and are supplied with a three-phase AC power supply.

Conventionally, in the condition that the three-phase AC power supply is normally connected to the three-phase induction motor in the normal order of phases, the three-phase induction motor is forwardly rotated to thereby normally driving the electrical equipment. However, in the case where the three-phase AC power supply is connected to the three-phase induction motor by mistake in an opposite phase condition, the three-phase induction motor is reverse rotated, resulting in an abnormal drive of the electrical equipment. Accordingly, occurrence of the opposite phase in the three-phase AC power supply, when occurs, needs to be detected with certainty at the starting of the three-phase induction motor, thereby taking a suitable countermeasure.

Japanese Laid-open Utility Model Application (Kokai) No. 62-70631 discloses one of conventional opposite phase detecting devices. In the disclosed device, each phase voltage of the three-phase AC power supply is half-wave rectified by a waveform shaping section and thereafter, a trigger pulse having a small width generated at the rising zero cross point of the half wave voltage by a pulse forming section. Two flip-flops and AND circuits are employed for determining the order of phases that the trigger pulses are generated.

The above-described prior detecting device has a problem that the number of circuit elements are increased though the opposite phase detecting operation thereof has a certain reliability.

SUMMARY OF THE INVENTION

Therefore, an object of the present invention is to provide an opposite phase detecting device wherein the number of circuit elements of the circuit for detecting the opposite phase condition of a polyphase AC power supply is reduced, thereby providing an economical advantage.

The present invention provides an opposite phase detecting device for alternating current electrical equipments, comprising a synchronous circuit generating first and second synchronizing pulses synchronizing a positive or negative half wave of first and second phase voltages or line voltages of a three-phase AC power supply supplied to an alternating current electrical equipment, respectively and having pulse widths approximately same as those of the first and second phase voltages or line voltages, respectively, a pulse generating circuit triggered by the second synchronizing pulse to thereby generate a reset pulse having a time interval shorter than the pulse width of each of the first and second synchronizing pulses generated by the synchronous circuit, a reset circuit generating a reset signal based on a logical multiplication of the reset pulse generated by said pulse generating circuit and the first synchronizing pulse generated by the synchronous circuit, and a counter circuit counting the first synchronizing pulses generated by said synchronous circuit, the counter circuit being reset when supplied with the reset signal from the reset circuit, the counter circuit generating an opposite phase detection signal when a count value thereof reaches a predetermined value.

In accordance with the opposite phase detecting device of the present invention, the second synchronizing pulse is generated in the duration of the first synchronizing pulse from the synchronous circuit when the three-phase AC power supply is in the normal condition of phase order with respect to the AC electrical equipment. Accordingly, the reset pulse is generated by the pulse generating circuit in the duration of the first synchronizing pulse and the reset signal is generated by the reset circuit, thereby resetting the counter circuit. On the other hand, when the three-phase AC power supply is in the opposite phase condition with respect to the AC electrical equipment, the second synchronizing pulse is not generated in the duration of the first synchronizing circuit from the synchronous circuit. Accordingly, the pulse signal generating circuit does not generate the pulse signal in the duration of the first synchronizing pulse and the reset signal is not generated by the reset circuit. Consequently, the counter circuit progresses with the counting operation and the opposite phase detection signal is generated by the counter circuit when the count value thereof reaches the predetermined value.

Other objects of the present invention will become obvious upon an understanding of the illustrative embodiment about to be described with reference to the accompanying drawings and various advantages not referred to herein will occur to one skilled in the upon employment of the invention in practice.

DESCRIPTION OF THE PREFERRED EMBODIMENT

An opposite phase detecting device of an embodiment of the invention will be described with reference to the accompanying drawings.

Figure 1:
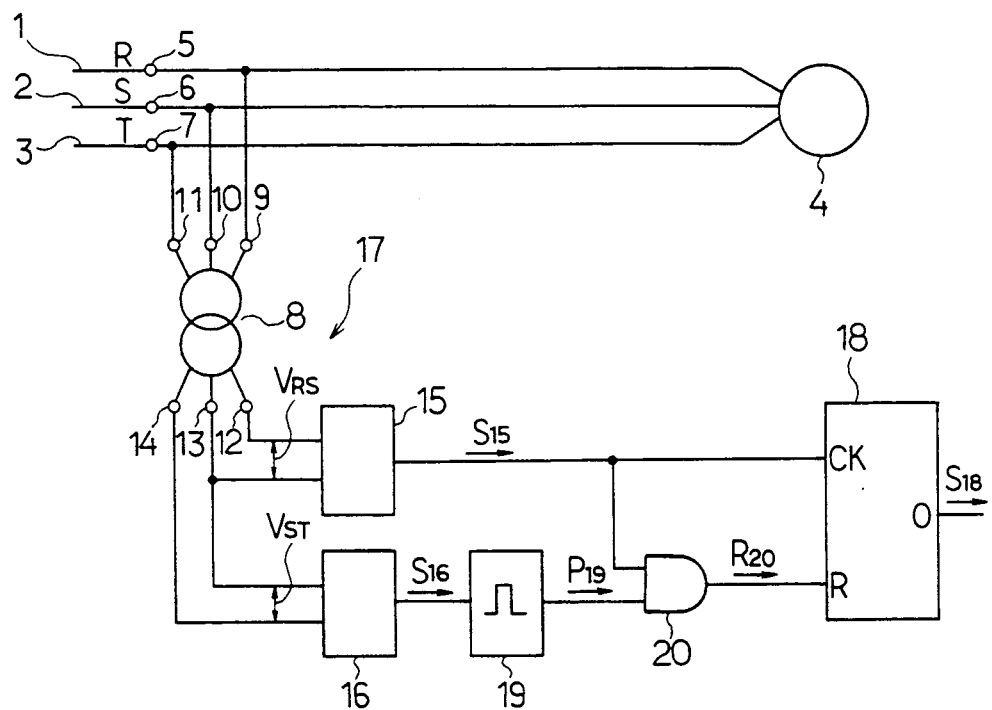
FIG. 1 illustrates an electrical arrangement of an opposite phase detecting device of an embodiment of the invention wherein a three-phase AC power supply is in the normal condition of phase order with respect to the an AC electrical equipment.

Referring first to FIG. 1, power supply lines 1, 2 and 3 of a three-phase AC power supply comprising phases R, S and T are connected to input terminals 5, 6 and 7 of a three-phase induction motor 4 as an AC electrical equipment, respectively. Input terminals 9, 10 and 11 of a transformer 8 are also connected to input terminals 5, 6 and 7 of the phases R, S and T, respectively. Transformer 8 forms a synchronous circuit 17 together with two zero cross circuits 15 and 16. Both input terminals of zero cross circuit 15 are connected to output terminals 12 and 13 of transformer 8, respectively. Both input terminals of the other zero cross circuit 16 are connected to output terminals 13 and 14 of transformer 8, respectively. Each of a first synchronizing pulse $S_{15}$ generated by zero cross circuit 15 as a first synchronous signal and a second synchronizing pulse $S_{16}$ generated by zero cross circuit 16 as a second synchronous signal is maintained at the high level H for a period corresponding to an electrical angle of 180 degrees or in the duration of a half wave of respective first and second line voltages of transformer 8 when the input voltage is increased from zero to the positive. When the input voltage is decreased from the positive to zero, each synchronizing pulse is maintained at the low level for the period corresponding to the electrical angle of 180 degrees or the duration of the half wave of each line voltage of transformer 8. An output terminal of zero cross circuit 15 is connected to a clock terminal CK of counter circuit 18. An input terminal of a one-shot multivibrator circuit 19 as pulse generating circuit is connected to an output terminal of zero cross circuit 16. One of input terminals of an AND circuit 20 as reset circuit is connected to the output terminal of zero cross circuit 15 and the other input terminal thereof is connected to an output terminal of one-shot multivibrator circuit 19. An output terminal of AND circuit 20 is connected to a reset terminal R of counter circuit 18. Counter circuit 18 generates an opposite phase detection signal $S_{18}$ at an output terminal O thereof when the count value thereof reaches a predetermined value N (N=2 or above). The predetermined count value N is desirably set with suitable setting means (not shown).

Figure 2:
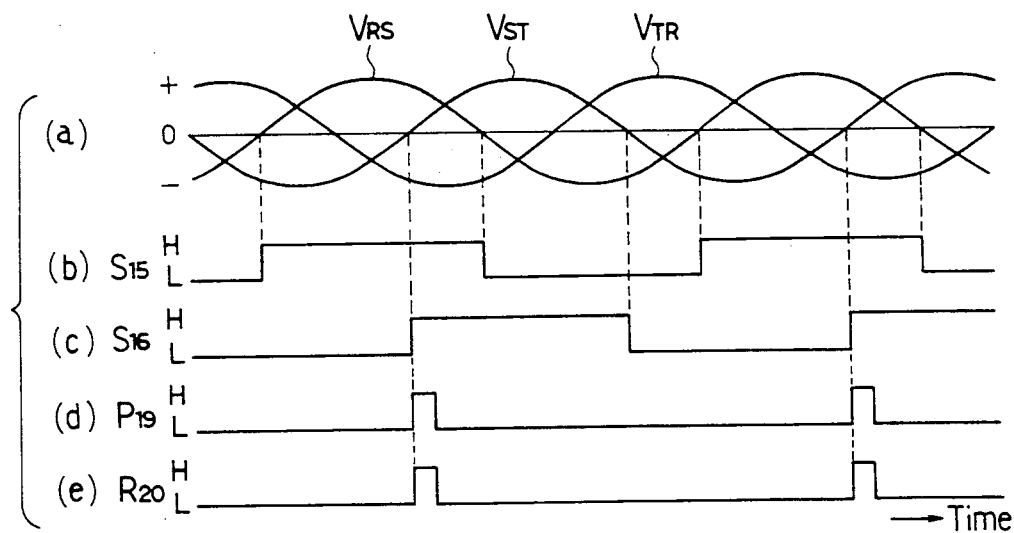
FIGS. 2(a) to 2(e) are a waveform chart showing the waveforms at various points of the device in FIG. 1.

Operation of the opposite phase detecting device will now be described with reference to FIG. 1 and further to FIGS. 2 to 4. First, when power lines 1, 2 and 3 of phases R, S and T are connected to input terminals 5, 6 and 7 of three-phase induction motor 4 in the normal phase order condition, respectively, as shown in FIG. 1, a first synchronous voltage $V_{RS}$ synchronizing a line voltage of phases R and S between power lines 1 and 2 is produced at output terminals 12 and 13 of transformer 8, as shown in FIG. 2(a). Further, a second synchronous voltage $V_{ST}$ synchronizing a line voltage of phases S and T between power lines 2 and 3 is produced between power lines 13 and 14, as shown in FIG. 2(a). FIG. 2(a) also shows a synchronous voltage $V_{TR}$ synchronizing a line voltage of phases T and R between power lines 3 and 1. Consequently, first synchronizing pulse $S_{15}$ generated by zero cross circuit 15 is maintained at the high level H in synchronization with a positive half wave of first synchronous voltage $V_{RS}$, as shown in FIG. 2(b). Further, second synchronizing pulse $S_{16}$ generated by zero cross circuit 16 is maintained at the high level H in synchronization with a positive half wave of second synchronous voltage $V_{ST}$, as shown in FIG. 2(c). When first synchronizing pulse $S_{15}$ is supplied to clock terminal CK of counter circuit 18, counter circuit 18 performs a counting operation in response to the rise of first synchronizing pulse $S_{15}$ from low level L to high level H with the result that counter circuit 18 increases the count value from "0" to "1." When second synchronizing pulse $S_{16}$ is supplied to the input terminal of one-shot multivibrator circuit 19, one-shot multivibrator circuit 19 is triggered in response to the rise of pulse $S_{16}$ from the low level L to the high level H, thereby generating a high level reset pulse having a predetermined width or a pulse signal $P_{19}$, as shown in FIG. 2(d). Thus, since pulse signal $P_{19}$ is generated during the period of the positive half wave of first synchronous pulse $V_{RS}$ or while first synchronizing pulse $S_{15}$ is maintained at the high level H, AND circuit 20 generates a high level reset signal $R_{20}$ as the result of the logical multiplication of pulse signal $P_{19}$ and first synchronizing pulse $S_{15}$, as shown in FIG. 2(e). High level reset signal $R_{20}$ is supplied to reset terminal R of counter circuit 18 and consequently, counter circuit 18 is reset to "0." Accordingly, even when the N-th cycle of first synchronous voltage $V_{RS}$ elapses, the count value of counter circuit 18 does not reach the predetermined count value "N" with the result that opposite phase detection signal $S_{18}$ is not generated.

Figure 3:
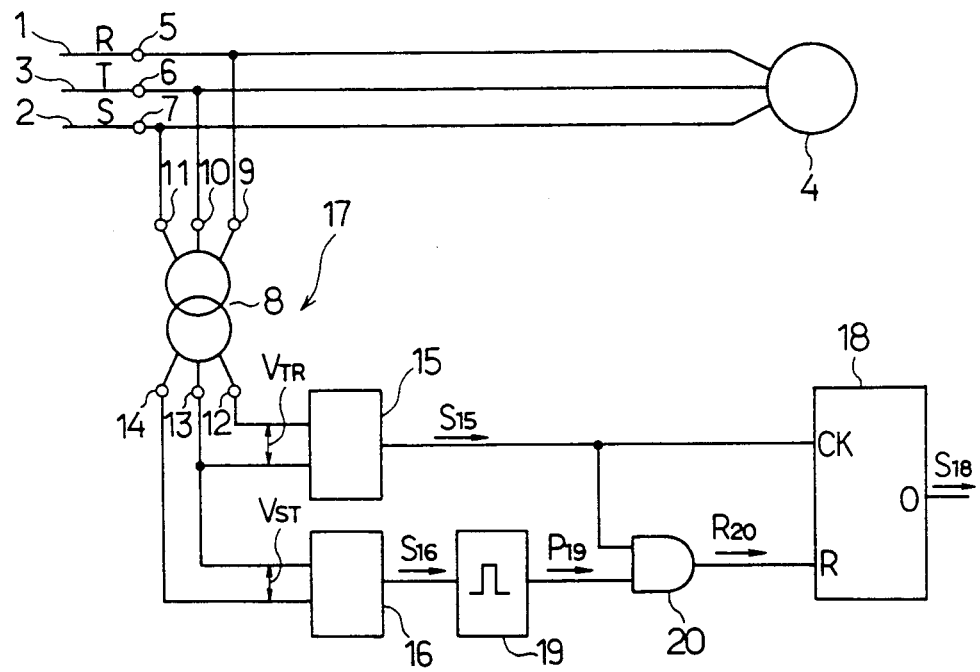
FIG. 3 is a view similar to FIG. 1 showing the case where the three-phase AC power supply is in the opposite phase condition with respect to the AC electrical equipment.
Figure 4:
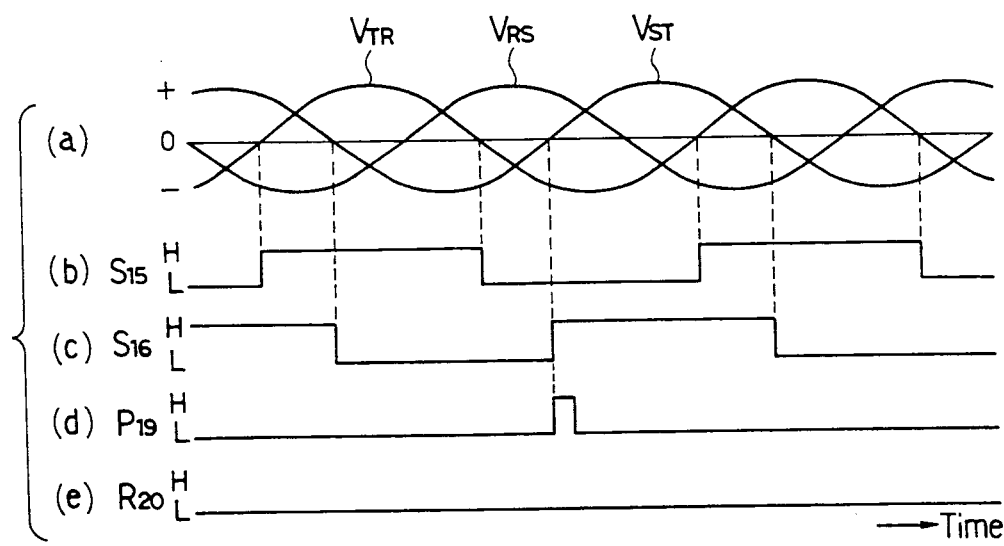
FIGS. 4(a) to 4(e) are a waveform chart showing the waveforms at various points of the device in FIG. 3.

On the other hand, when power lines 2 and 3 of phases S and T are, for example, connected by mistake to input terminals 7 and 6 of three-phase induction motor 4, respectively, as shown in FIG. 3, first synchronous voltage $V_{TR}$ synchronizing the line voltage of phases T and R between power lines 3 and 1 is produced between output terminals 12 and 13 of transformer 8 and second synchronous voltage $V_{ST}$ synchronizing the line voltage of phases S and T between power lines 2 and 3 is produced between output terminals 13 and 14 of transformer 8, as shown in FIG. 4(a). Accordingly, first synchronizing pulse $S_{15}$ generated by zero cross circuit 15 is turned to the high level H in synchronization with the positive half wave of first synchronous voltage $V_{TR}$, as shown in FIG. 4(b) and second synchronizing pulse $S_{16}$ generated by zero cross circuit 16 is turned to the high level H in synchronization with the positive half wave of second synchronous voltage $V_{ST}$, as shown in FIG. 4(c). When first synchronizing pulse $S_{15}$ generated by zero cross circuit 15 is supplied to clock terminal CK of counter circuit 18, counter circuit 18 performs an counting operation in response to the rise of first synchronizing pulse $S_{15}$ from the low level L to the high level H, thereby changing the count value from "0" to "1." Further, when second synchronizing pulse $S_{16}$ generated by zero cross circuit 16 is supplied to the input terminal of one-shot multivibrator circuit 19, it is triggered as the result of the rise of second synchronizing pulse $S_{16}$ from the low level L to the high level H, thereby generating high level pulse signal $P_{19}$, as shown in FIG. 4(d). However, since pulse signal $P_{19}$ is not generated during the period of the positive half wave of first synchronous voltage $V_{TR}$ or in the duration of first synchronizing pulse $S_{15}$, AND circuit 20 does not generate high level reset signal $R_{20}$ as the result of failure of the logical multiplication, as shown in FIG. 4(e). Accordingly, the count value of counter circuit 18 is maintained at "1." Consequently, the count value of counter circuit 18 reaches the predetermined value N with elapse of the N-th cycle of first synchronous voltage $V_{TR}$ and opposite phase detection signal $S_{18}$ is generated by counter circuit 18.

As described above, when power lines 1, 2 and 3 of phases R, S and T are normally connected to input terminals 5, 6 and 7 of three-phase induction motor 4 in the normal phase order condition, respectively, one-shot multivibrator circuit 19 is triggered by the rise of second synchronizing pulse $S_{16}$ from zero cross circuit 16 from the low level L of the high level H while first synchronizing pulse $S_{15}$ from zero cross circuit 15 is maintained at the high level H, thereby generating pulse signal $P_{19}$. In response to pulse signal $P_{19}$, AND circuit 20 generates a reset signal $R_{20}$ to thereby rest counter circuit 18 counting first synchronous voltage $V_{RS}$ or first synchronizing pulse $S_{15}$. Consequently, when power lines 2 and 3 of phases S and T are connected by mistake to input terminals 7 and 6 of three-phase induction motor 4 in the opposite phase condition, respectively, reset signal $R_{20}$ is not generated by AND circuit 20 and therefore, counter circuit 18 continuously performs the counting of first synchronous voltage $V_{TR}$ or first synchronizing pulse $S_{15}$. As a result, the count value of counter circuit 18 reaches the predetermined count value, "N" with elapse of the N-th cycle of first synchronous voltage $V_{TR}$ with the result that the counter circuit 18 generates opposite phase detection signal $S_{18}$. A suitable countermeasure such as actuation of an alarm device or break of the power supply circuit for three-phase induction motor 4 may be taken. Thus, three-phase induction motor 4 may be prevented from being reverse rotated in the opposite phase condition in a short period from the first to N-th cycle of the three-phase AC power supply with certainty. Furthermore, two of the three phases are detected and the device of the present invention has a simple circuit arrangement of transformer 8, zero cross circuits 15 and 16, counter circuit 18, one-shot multivibrator 19 and AND circuit 20, thereby providing an economical advantage.

Although the foregoing embodiment describes the case of the false connection of power lines 2 and 3 of phases S and T, the device of the present invention may be applied to cases of the false connection of power lines 1 and 2 of phases R and S and the false connection of power lines 3 and 1 of phases T and R.

Although zero cross circuits 15 and 16 are employed in the opposite phase detecting device in the foregoing embodiment, Schmitt circuits may be employed for the zero cross circuits. Further, although first and second synchronizing pulses are obtained from the line voltages of the three-phase AC power supply in the foregoing embodiment, they may be obtained from phase voltages.

The foregoing disclosure and drawings are merely illustrative of the principles of the present invention and are not to be interpreted in a limiting sense. The only limitation is to be determined from the scope of the appended claims.

What I claim is:

1. An opposite phase detecting device for alternating current electrical equipments, comprising:
    a) a synchronous circuit generating first and second synchronizing pulses synchronizing a positive or negative half wave of first and second line voltages or phase voltages of a three-phase AC power supply supplied to an alternating current electrical equipment, respectively and having pulse widths approximately same as those of the first and second phase voltages or line voltages, respectively;
    b) a pulse generating circuit triggered by the second synchronizing pulse to thereby generate a reset pulse having a time interval shorter than the time interval of each of the first and second synchronizing pulses generated by said synchronous circuit;
    c) a reset circuit generating a reset signal based on a logical multiplication of the reset pulse generated by said pulse generating circuit and the first synchronizing pulse generated by said synchronous circuit; and
    d) a counter circuit counting the first synchronizing pulses generated by said synchronous circuit, said counter circuit being reset when supplied with the reset signal from said reset circuit, said counter circuit generating an opposite phase detection signal when a count value thereof reaches a predetermined value.

* * * * *